United States Patent
Biskupski et al.

(10) Patent No.: US 8,640,949 B2
(45) Date of Patent: Feb. 4, 2014

(54) METHOD FOR ASSEMBLING AND ACTIVATING A MULTI-PACK PACKAGE OF TRANSACTION CARDS

(75) Inventors: Ted Biskupski, Cupertino, CA (US); Christina Lee Bachmann, San Jose, CA (US); Glenn Epis, Sunnyvale, CA (US); Darryl Chan, Pleasanton, CA (US); Sushil Gupta, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 782 days.

(21) Appl. No.: 12/262,097

(22) Filed: Oct. 30, 2008

(65) Prior Publication Data
US 2009/0218392 A1      Sep. 3, 2009

Related U.S. Application Data

(63) Continuation-in-part of application No. 12/041,536, filed on Mar. 3, 2008.

(51) Int. Cl.
G06K 5/00      (2006.01)
G06K 7/00      (2006.01)
G06K 19/00     (2006.01)

(52) U.S. Cl.
USPC ............................ 235/380; 235/486; 235/487

(58) Field of Classification Search
USPC ................... 235/380, 379, 486, 487; 705/64; 206/470
See application file for complete search history.

(56) References Cited

U.S. PATENT DOCUMENTS

| | | |
|---|---|---|
| 846,064 A | 3/1907 | Souder |
| 3,346,294 A | 10/1967 | Sartz |
| 4,319,684 A | 3/1982 | Backman et al. |
| 4,828,105 A | 5/1989 | Silengo et al. |
| 5,036,645 A | 8/1991 | Schwarz |
| 5,135,157 A | 8/1992 | Cruz |
| 5,139,454 A | 8/1992 | Earnest |
| 5,143,279 A | 9/1992 | Gaines |
| 5,219,184 A | 6/1993 | Wolf |
| 5,263,586 A | 11/1993 | Keable |
| D344,757 S | 3/1994 | Kruyt |
| 5,467,917 A | 11/1995 | Potter |

(Continued)

FOREIGN PATENT DOCUMENTS

| | | |
|---|---|---|
| EP | 0725376 | 8/1996 |
| EP | 0927945 | 7/1999 |

(Continued)

OTHER PUBLICATIONS

"Identification Cards—Recording Technique—Part 7: Magnetic Strip—High Coercivity, High Density", ISO Standard, ISO/IEC 7811-7:2004 downloaded Dec. 26, 2007, 2 pgs.

(Continued)

*Primary Examiner* — Thien T Mai

(57) ABSTRACT

Methods and apparatus for providing multiple transaction cards in a single package are disclosed. According to one aspect, a method for forming a carrier package arrangement includes obtaining a plurality of transaction cards, obtaining a first parent activation code, and associating the first parent activation code with the plurality of transaction cards. The method can also include packing the plurality of transaction cards in the carrier package arrangement, and providing the first parent activation code so as to be on or accessible from the carrier package arrangement. The plurality of transaction cards can thereafter be activated using the first parent activation code.

20 Claims, 10 Drawing Sheets

(56) References Cited

U.S. PATENT DOCUMENTS

| | | | |
|---|---|---|---|
| 5,516,033 A | 5/1996 | Bernetich | |
| 5,573,117 A | 11/1996 | Adams | |
| 5,575,384 A | 11/1996 | Saye | |
| 5,626,551 A | 5/1997 | Kearns et al. | |
| 5,641,115 A | 6/1997 | Brewster | |
| 5,645,214 A | 7/1997 | Taganas | |
| 5,650,209 A | 7/1997 | Ramsburg et al. | |
| 5,687,992 A | 11/1997 | Finkelshteyn | |
| 5,755,375 A | 5/1998 | Rogers | |
| 5,760,381 A | 6/1998 | Stich et al. | |
| 5,791,474 A | 8/1998 | Hansen | |
| D400,919 S | 11/1998 | Pickel | |
| 5,842,629 A | 12/1998 | Sprague et al. | |
| 5,845,425 A | 12/1998 | Leake et al. | |
| 5,862,979 A | 1/1999 | Hill et al. | |
| 5,906,063 A | 5/1999 | Magee, Sr. | |
| 5,918,909 A | 7/1999 | Fiala et al. | |
| 5,941,573 A | 8/1999 | Yordinsky | |
| 5,946,834 A | 9/1999 | Bradley | |
| 5,947,283 A | 9/1999 | Marshall | |
| 5,963,915 A | 10/1999 | Kirsch | |
| 5,963,916 A | 10/1999 | Kaplan | |
| 5,981,040 A | 11/1999 | Rich et al. | |
| 5,984,091 A | 11/1999 | Orr et al. | |
| 6,003,254 A | 12/1999 | Lorber | |
| 6,050,415 A | 4/2000 | Lind et al. | |
| 6,053,321 A * | 4/2000 | Kayser | 206/470 |
| 6,070,719 A | 6/2000 | Pollock | |
| 6,092,841 A | 7/2000 | Best et al. | |
| 6,199,912 B1 | 3/2001 | Finkelshteyn | |
| 6,224,108 B1 | 5/2001 | Klure | |
| 6,233,682 B1 | 5/2001 | Fritsch | |
| 6,244,444 B1 | 6/2001 | Jacobus et al. | |
| D447,055 S | 8/2001 | Several et al. | |
| 6,270,012 B1 | 8/2001 | Dawson | |
| 6,299,530 B1 | 10/2001 | Hansted et al. | |
| 6,349,829 B1 | 2/2002 | Matheis et al. | |
| D457,555 S | 5/2002 | Stephens-D'Angelo et al. | |
| 6,385,596 B1 | 5/2002 | Ansell et al. | |
| 6,418,648 B1 | 7/2002 | Hollingsworth et al. | |
| 6,457,638 B1 | 10/2002 | Schmidt | |
| 6,491,213 B2 | 12/2002 | Purcell | |
| 6,619,480 B2 | 9/2003 | Smith | |
| 6,659,271 B2 | 12/2003 | Parsons | |
| 6,698,116 B2 | 3/2004 | Waldron | |
| 6,731,312 B2 | 5/2004 | Robbin | |
| 6,957,737 B1 * | 10/2005 | Frederickson et al. | 235/380 |
| D512,456 S | 12/2005 | Diaz et al. | |
| 7,055,740 B1 | 6/2006 | Schultz et al. | |
| D541,647 S | 5/2007 | Ashby et al. | |
| 7,243,839 B2 | 7/2007 | Beck et al. | |
| D548,279 S | 8/2007 | Gulakos | |
| 7,277,870 B2 | 10/2007 | Mourad et al. | |
| 7,278,584 B1 | 10/2007 | Gandel et al. | |
| 7,322,519 B2 | 1/2008 | Blank et al. | |
| 7,367,504 B2 | 5/2008 | Lewis et al. | |
| 7,374,095 B2 | 5/2008 | Blank et al. | |
| 7,409,788 B2 | 8/2008 | Lauer et al. | |
| 7,490,720 B2 | 2/2009 | Cole et al. | |
| 7,500,604 B2 | 3/2009 | Holme | |
| 7,546,288 B2 | 6/2009 | Springer et al. | |
| 7,584,887 B1 | 9/2009 | Sanchez et al. | |
| 7,607,574 B2 | 10/2009 | Kingsborough et al. | |
| 7,712,741 B2 | 5/2010 | Lambert | |
| 7,740,170 B2 | 6/2010 | Singh et al. | |
| 7,822,640 B2 * | 10/2010 | Arthur et al. | 235/379 |
| 7,837,125 B2 | 11/2010 | Biskupski et al. | |
| 7,896,252 B2 | 3/2011 | Narlinger et al. | |
| 8,256,682 B2 | 9/2012 | Chakiris et al. | |
| 2001/0034703 A1 | 10/2001 | Picciallo et al. | |
| 2001/0040115 A1 | 11/2001 | Wani et al. | |
| 2001/0045738 A1 | 11/2001 | Klure | |
| 2002/0002468 A1 | 1/2002 | Geisler et al. | |
| 2002/0028321 A1 | 3/2002 | Feilen et al. | |
| 2002/0080714 A1 | 6/2002 | Pierson et al. | |
| 2002/0088855 A1 | 7/2002 | Hodes | |
| 2002/0147683 A1 | 10/2002 | Capobianco et al. | |
| 2002/0157974 A1 | 10/2002 | Krahn | |
| 2002/0195816 A1 | 12/2002 | Anise | |
| 2003/0004889 A1 * | 1/2003 | Fiala et al. | 705/64 |
| 2003/0018586 A1 | 1/2003 | Krahn | |
| 2003/0066777 A1 | 4/2003 | Malone | |
| 2003/0150142 A1 | 8/2003 | Street | |
| 2003/0156686 A1 | 8/2003 | Pines | |
| 2003/0230501 A1 | 12/2003 | Smolev | |
| 2004/0064374 A1 | 4/2004 | Cho | |
| 2004/0140361 A1 | 7/2004 | Paul et al. | |
| 2004/0140616 A1 | 7/2004 | Davis | |
| 2004/0254836 A1 | 12/2004 | Emoke Barabas et al. | |
| 2004/0267622 A1 | 12/2004 | Taylor et al. | |
| 2004/0268386 A1 | 12/2004 | Logan et al. | |
| 2005/0017502 A1 | 1/2005 | Chariker | |
| 2005/0100312 A1 | 5/2005 | Commons et al. | |
| 2005/0167301 A1 | 8/2005 | Oram | |
| 2005/0167910 A1 | 8/2005 | Candler | |
| 2005/0171795 A1 | 8/2005 | Kearby et al. | |
| 2005/0182675 A1 | 8/2005 | Huettner | |
| 2005/0279825 A1 | 12/2005 | Ashby et al. | |
| 2006/0032764 A1 | 2/2006 | Swenson | |
| 2006/0042986 A1 | 3/2006 | Simkowski | |
| 2006/0065748 A1 | 3/2006 | Halbur et al. | |
| 2006/0086630 A1 | 4/2006 | Cheong et al. | |
| 2006/0118618 A1 | 6/2006 | Schultz et al. | |
| 2006/0185201 A1 | 8/2006 | Fachon et al. | |
| 2006/0212401 A1 | 9/2006 | Ameerally et al. | |
| 2006/0224516 A1 | 10/2006 | Lemon et al. | |
| 2006/0235864 A1 | 10/2006 | Hotelling et al. | |
| 2006/0243609 A1 | 11/2006 | Cole et al. | |
| 2006/0259189 A1 | 11/2006 | Perlow et al. | |
| 2006/0261154 A1 | 11/2006 | Arthur et al. | |
| 2007/0017973 A1 | 1/2007 | Blank et al. | |
| 2007/0038577 A1 | 2/2007 | Werner et al. | |
| 2007/0063052 A1 | 3/2007 | Chakiris et al. | |
| 2007/0090184 A1 | 4/2007 | Lockwood et al. | |
| 2007/0154167 A1 | 7/2007 | Ando et al. | |
| 2007/0174200 A1 | 7/2007 | Sung-Min et al. | |
| 2007/0187492 A1 | 8/2007 | Graves et al. | |
| 2007/0198418 A1 | 8/2007 | Macdonald et al. | |
| 2007/0208664 A1 | 9/2007 | Ortega | |
| 2007/0224969 A1 | 9/2007 | Rao | |
| 2007/0267502 A1 | 11/2007 | Zellner et al. | |
| 2007/0278280 A1 | 12/2007 | Wert et al. | |
| 2007/0289890 A1 | 12/2007 | Appelbaum | |
| 2008/0052371 A1 | 2/2008 | Partovi et al. | |
| 2008/0116088 A1 | 5/2008 | Roberts | |
| 2008/0116089 A1 | 5/2008 | Roberts | |
| 2008/0120609 A1 | 5/2008 | Gates et al. | |
| 2008/0154722 A1 | 6/2008 | Galinos | |
| 2008/0159715 A1 | 7/2008 | Fuasaro et al. | |
| 2008/0188209 A1 | 8/2008 | Dorogusker et al. | |
| 2008/0190267 A1 | 8/2008 | Rechstein et al. | |
| 2008/0320139 A1 | 12/2008 | Fukuda et al. | |
| 2009/0063292 A1 | 3/2009 | Cole et al. | |
| 2009/0104539 A1 | 4/2009 | Watanabe et al. | |
| 2009/0218392 A1 | 9/2009 | Biskupski et al. | |
| 2009/0283594 A1 | 11/2009 | Walton et al. | |
| 2010/0219099 A1 | 9/2010 | Schmitt et al. | |
| 2010/0253063 A1 | 10/2010 | Skogster | |
| 2011/0137793 A1 | 6/2011 | Liggett | |
| 2012/0025516 A1 | 2/2012 | Miller et al. | |
| 2012/0234909 A1 | 9/2012 | Tang | |
| 2012/0259718 A1 | 10/2012 | Miller et al. | |

FOREIGN PATENT DOCUMENTS

| | | |
|---|---|---|
| EP | 1111562 | 6/2001 |
| FR | 2827981 | 1/2003 |
| WO | WO99/24942 A | 5/1999 |
| WO | WO00/28461 | 5/2000 |
| WO | WO00/43852 | 7/2000 |
| WO | WO00/62265 | 10/2000 |
| WO | WO01/41023 | 6/2001 |
| WO | WO01/44908 | 6/2001 |
| WO | WO01/46786 | 6/2001 |

(56) References Cited

FOREIGN PATENT DOCUMENTS

| WO | WO01/50305 | | 7/2001 |
|---|---|---|---|
| WO | WO02/08869 | | 1/2002 |
| WO | WO 03007233 | A1 * | 1/2003 |
| WO | 2004/038567 | A | 5/2004 |
| WO | 2004/044770 | A | 5/2004 |

OTHER PUBLICATIONS

"American National Standard Specifications for Credit Cards", American National Standards Institute, Inc. (ANSI), x4.13/1971, 1971, 18 pgs.

"American National Standard Magnetic-Stripe Encoding for Credit cards", American National Standards Institute, Inc. (ANSI), x4.16/1976, 1976, 12 pgs.

Offenberg, J. "Markets—Gift Cards", Journal of Economic Perspectives, vol., 21, No. 2, Spring 2007, pp. 227-238.

U.S. Appl. No. 11/965,674, entitled "Methods and Systems for Encoding a Magnetic Stripe", filed Dec. 27, 2007.

U.S. Appl. No. 12/041,536, entitled "Multi-Pack Gift Card and Activation Thereof", filed Mar. 3, 2008.

U.S. Appl. No. 12/197,975, entitled "Carrier Card Arrangement with Removable Envelope", filed Aug. 25, 2008.

"Identification Cards-Recording Technique", International Standard ISO/IEC, vol. 7811-2, No. Third Edition, Feb. 1, 2001, pp. 1-21.

Pottery Barn, Gift Cards, Web Page, downloaded Jun. 27, 2008, 1 pg.

"list." Dictionary of Publishing and Printing. London: A&C Black, 2006, www.credoreference.com/entry/acbpublishing/list, p. 1.

"listing." Collins English Dictionary. London: Collins, 2000, www.credoreference.com/entry/hcengdict/listing, p. 1.

"bin." Collins English Dictonary, London: Collins, 2000, www.credoreference.com/entry/hcengdict/bin, p. 1.

"rack 1",Collins English Dictonary, London, Collins 2000, www.credoreference.com/entry/hcengdict.rack_1, 1 pg.

"price", Chambers 21st Centruy Dictonary, London, Chambers Harrap, 2001, www.credoreference.com/entry/chambdict/price, 1 pg.

"allow", Webster's Third New International Dictionary, Merriam-Webster, downloaded Jul. 14, 2009, http://lionreference.chadwyck.com/searchFulltext.do?id=871261&idType=offset&divLevel=2&queryId../sessions/1247680262_19043&area=mwd&forward=refshelf&trail=refshelf, 2 pg.

"value", Webster's Third New International disconary, Merriam-Webster, Incorporated, downloaded Jul. 15, 2009, http://lionreference.chadwyck.com/searchFulltext.do?id=38664807&idTyple=offset&divLevel=2&queryID../session/1247683362_2487&area=mwd&forward=refshelf&trail=refshelf, p. 4.

"media", Chambers 21st Century Dictionary, London, Chambers Harrap, 2001, downloaded Jul. 15, 2009, www.credoreference.com/entry/chambdict/media.com, 1 pg.

"associate", Collins English Dictionary, London, Collins 2000, www.credoreference.com/entry/hcengdict/associate, 1 pg.

"active", Webster's Third New International Dictionary, Merriam-Webster, Inc., downloaded Jul. 16, 2009, http://lionreference.chadwyck.com/searchFulltext.do?id=313560&idType=offset&divLevel=2&queryID../session/1247778592_27918&area=mwd&forward=refshelf&trail=refshelf, 3 pg.

"activate", Webster's Third New International Dictionary, Merriam-Webster, Inc., downloaded Jul. 16, 2009, http://lionreference.chadwyck.com/searchFulltext.do?id=312239&idType=offset&divLevel=2&queryID../session/1247778879_29216&area=mwd&forward=refshelf&trail=refshelf, 2 pg.

The Bank Credit Card Business, 2nd Edition, American Bankers Association, Washington D.C., 1996, pp. 1-13, 63-89.

Smart Card Handbook, 2nd Edition, W. Rankl and W. Effing, John Wiley and Sons, West Sussex, England, 2000, 49 pgs.

* cited by examiner

METHOD FOR ASSEMBLING AND ACTIVATING A MULTI-PACK PACKAGE OF TRANSACTION CARDS

CROSS-REFERENCE TO OTHER APPLICATION

The present invention is a continuation-in-part application to U.S. patent application Ser. No. 12/041,536, filed Mar. 3, 2008, and entitled "Multi-Pack Gift Card and Activation Thereof", which is incorporated herein by reference in its entirety.

BACKGROUND OF THE INVENTION

1. Field of the Invention

The present invention relates to transaction cards and, more particularly, to providing multiple monetary transaction cards in a single package and enabling the multiple monetary transaction cards to be activated substantially simultaneously.

2. Description of the Related Art

Monetary transaction cards generally include smart cards, credit cards, debit cards, automatic teller machine (ATM) cards, identification (ID) cards, and pre-paid cards such as gift cards. Typically, monetary transaction cards are of a standard credit card size, or a size of a CR-80 card. The monetary transaction cards generally include a magnetic stripe which includes a number of tracks encoded thereon. Information associated with the monetary transaction cards is stored on the tracks.

Monetary transaction cards that are gift cards or other pre-paid cards are often attached to carrier cards, and displayed at retail locations. Carrier assemblies often include transaction cards that are mounted to carrier cards using an adhesive. Such carrier assemblies may include openings which enable the carrier assemblies to be hung on a rack for display purposes.

To activate a transaction card that is a part of a carrier assembly, a purchaser may remove the carrier assembly from a display rack, and bring the carrier assembly to a point-of-sale (POS). When such a purchaser wishes to purchase or otherwise obtain multiple transaction cards, he or she selects individual transaction cards which are then individually activated, e.g., using a computing system at a POS. When transaction cards are to be activated, activating the transaction card one-by-one may be inefficient.

Therefore, what is needed is a method and an apparatus for facilitating the activation of more than one transaction card using a single POS transaction. That is, what is desired is a method and an apparatus for activating multiple transaction cards substantially simultaneously and efficiently.

SUMMARY OF THE INVENTION

The present invention pertains to providing and facilitating activation of multiple transaction cards (e.g., pre-paid cards). The present invention may be implemented in numerous ways, including, but not limited to, as a method, system, device, or apparatus (including computer program code). Exemplary embodiments of the present invention are discussed below.

According to one aspect of the present invention, a method for forming a carrier package arrangement includes obtaining a plurality of transaction cards, obtaining a first parent activation code, and associating the first parent activation code with the plurality of transaction cards. The method also includes packing the plurality of transaction cards in the carrier package arrangement, and providing the first parent activation code so as to be on or accessible from the carrier package arrangement. The plurality of transaction cards is activated using the first parent activation code.

According to another aspect of the present invention, a method of activating a plurality of transaction cards included in a card package that has a package activation code includes obtaining information associated with the package activation code. The information is used to identify the transaction cards as being mapped to the package activation code. A determination is made as to whether each transaction card of is in an unactivated state. If each transaction card is in an unactivated state, the package activation code is used to transition each transaction card from an unactivated state to an activated state.

In accordance with still another aspect of the present invention, a carrier package arrangement includes a carrier card arrangement, a tray, and a plurality of transaction cards. The transaction cards are mounted on the tray, and the tray is supported within the carrier card arrangement. The transaction cards are arranged to be transitioned from an unactivated state to an activated state using a first activation code associated with the carrier package arrangement.

According to yet another aspect of the present invention, a method for forming carrier package arrangements includes obtaining a plurality of transaction cards. The transaction cards include a first transaction card having a first card activation code and a second transaction card having a second card activation code. The method also includes obtaining a parent code file that specifies at least a first parent code and a second parent code. A first set of transaction cards is defined to include at least the first transaction card. The first parent code is mapped to the first set of transaction cards such that the first parent code is mapped to at least the first card activation code. The method further includes assembling the first set of transaction cards into a first carrier package arrangement, and providing the first parent code on the first carrier package arrangement. The first set of transaction cards is arranged to be activated using the first parent code.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, in which.

DETAILED DESCRIPTION OF THE INVENTION

Figure 1:
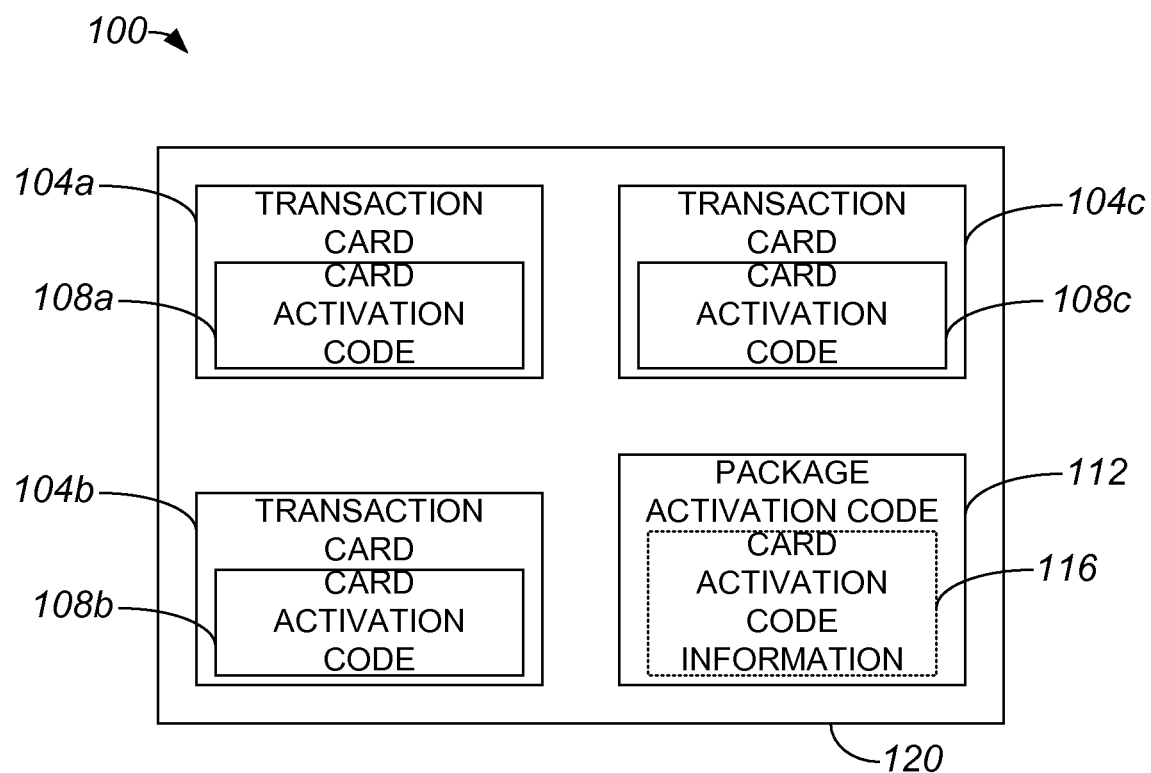
FIG. 1 is a block diagram representation of a multi-pack package of transaction cards which includes a package code in accordance with an embodiment of the present invention.

Exemplary embodiments of the present invention are discussed below with reference to the various figures. However, those skilled in the art will readily appreciate that the detailed description given herein with respect to these figures is for explanatory purposes, as the invention extends beyond these embodiments.

Providing multiple transaction cards, e.g., pre-paid cards such as gift cards, in a single package such that the transaction cards may substantially all be activated at one time increases the efficiency with which separate gift cards may be activated. By way of example, a package that contains multiple gift cards may be arranged such that a single activation code associated with the package may be used to activate all of the gift cards at the same time. When information relating to the single activation code, or the "package code," is provided to an authentication and authorization system, the authentication and authorization system may cause all of the gift cards included in the package to be activated.

A multi-pack package of transaction cards may include multiple transaction cards that are mounted on a carrier card or a holder, or otherwise associated with a carrier card or a holder. The carrier card (or holder) and the multiple transaction cards may effectively form a carrier assembly. A single activation code or package code that allows the multiple transaction cards to be activated may be provided on the carrier card or holder.

The activation codes of the transactions cards included in a multi-pack package of transaction cards are identified as being associated with a package code that is associated with the multi-pack package. Hence, verifying or otherwise activating the package code generally causes the transaction cards to be activated. In other words, the activation of a package code associated with a multi-pack package of transaction cards effectively causes each of the transaction cards to be verified and activated.

A package or parent code may, in one embodiment, be associated with a set of transaction or child cards that is to be part of a multi-pack package substantially only after the set of transaction cards is identified during a multi-pack package assembly process. By associating a set of transaction cards with a package card after the set of transaction cards is identified during a multi-pack package assembly process, the assembly process may be facilitated. For example, the assembly process may be facilitated because the need to keep track of transaction cards from the time transaction cards are received at an assembly plant is reduced. Substantially eliminating the need to verify that the correct transaction cards remain together for subsequent packaging into a single multi-pack package increases the efficiency and flexibility with which the transaction cards may be processed, as substantially random transaction cards may be handled and associated with a package code relatively late in multi-pack package assembly process.

Referring initially to FIG. 1, a multi-pack package of transaction cards which includes a single package code will be described in accordance with an embodiment of the present invention. A package 100 generally includes a carrier card arrangement 120 on which, or within which, multiple transaction cards 104*a-c* are mounted or otherwise secured. Package 100 also includes a package activation code 112. Package activation code 112 may be printed on a surface of carrier card arrangement 120. In one embodiment, package activation code 112 may be embodied as a bar code. Such a bar code may be associated with other codes, e.g., a numeric code, which may be arranged to substantially distinguish package activation code 112 from other card activation codes.

Each transaction card 104*a-c* has an associated card activation code 108*a-c*, respectively. Card activation codes 108*a-c* are unique codes which enable their respective transaction cards 104*a-c* to be activated upon activation of package activation code 112. In other words, because package activation code 112 typically includes or otherwise identifies information 116 which identifies card activation codes 104*a-c* with which package activation code 112 is associated, when package activation code 112 is activated, transaction cards 104*a-c* are activated. As such, the verification and/or activation of package activation code 112 is arranged to enable each transaction card 104*a-c* to be activated.

Figure 2:
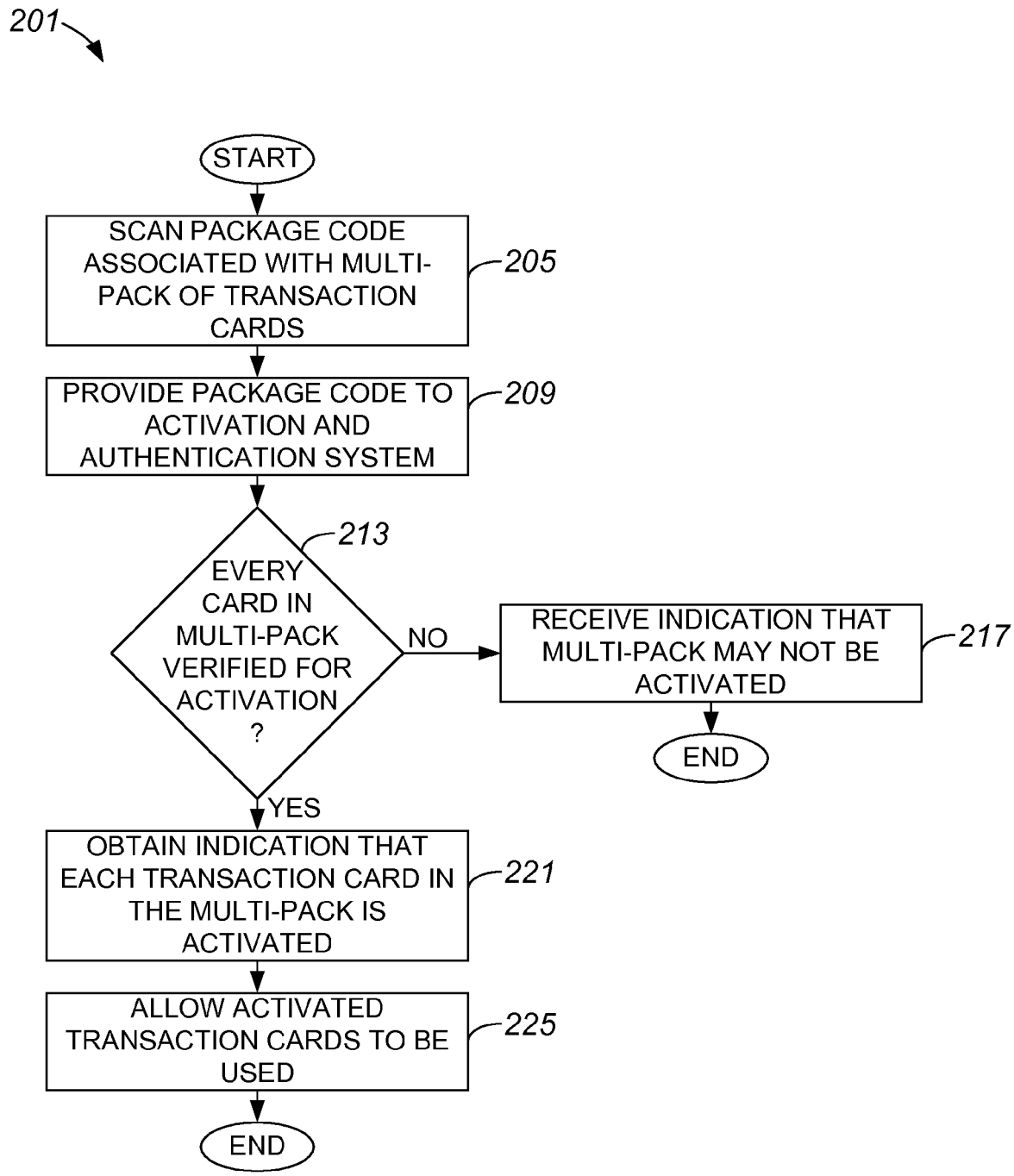
FIG. 2 is a process flow diagram which illustrates a method of activating a multi-pack package of transaction cards from the point-of-view of a point-of-sale (POS) in accordance with an embodiment of the present invention.

FIG. 2 is a process flow diagram which illustrates a method of activating a multi-pack package of transaction cards which has a single package activation code from the point-of-view of a point-of-sale (POS) in accordance with an embodiment of the present invention. A process 201 of activating a multi-pack package of transaction cards that has a single package code from the point-of-view of a POS begins at step 205 in which a package code, e.g., an activation code, associated with a multi-pack package of transaction cards is scanned. A multi-pack package of transaction cards may be scanned or otherwise read at a point-of-sale in order to obtain information associated with the transaction cards. The package code may be embodied as a bar code that is present on a surface of a carrier card, although the package code is not limited to being a bar code.

After the package code is scanned, the package code is provided in step 209 from the point-of-sale to an activation and authentication system. That is, information that is obtained from the package code is sent or otherwise transmitted to the activation and authentication system such that the activation and authentication system may activate the individual transaction cards that are associated with the package code.

A determination is made in step 213 as to whether the activation and authentication system has verified every transaction card in the multi-pack package for activation. In other words, it is determined in step 213 whether each transaction card included in the multi-pack package has been successfully activated using the package code. If it is determined that the multi-pack package is not activated, then process flow proceeds to step 217 in which an indication is received that the transaction cards in the multi-pack package may not be activated. Once the indication that the transaction cards may not be activated is received, the process of activating the multi-pack package is completed.

Alternatively, if it is determined in step 213 that every card in the multi-pack package is verified for activation, the indication is that each transaction card included in the multi-pack package has been activated. Accordingly, in step 221, an indication is obtained from the activation and authentication system which indicates that each transaction card in the multi-pack package is activated. Such an indication may indicate that each transaction card has been transitioned from an unactivated state to an activated state using the package code. After the indication is obtained, the transaction cards are effectively activated and, hence, ready for use in step 225. The process of activating the multi-pack package of transaction cards that has a single package code is completed upon allowing the activated transaction cards to be used.

When an activation and authentication system obtains a package code for a multi-pack package of transaction cards, the activation and authentication system may identify the individual card activation codes associated with the package code, determine whether the individual card activation codes are valid, and activate the transaction cards as appropriate. The activation and authentication system may be associated with, for example, an originator or a retailer of the transaction cards. In one embodiment, activation and authentication system may be an overall computing system associated with a retailer which provides cash value, goods, and/or services when a transaction card is activated and/or redeemed. The package code may be a code, e.g., a 16-digit alphanumeric code, that is specific to a retailer.

Figure 3:
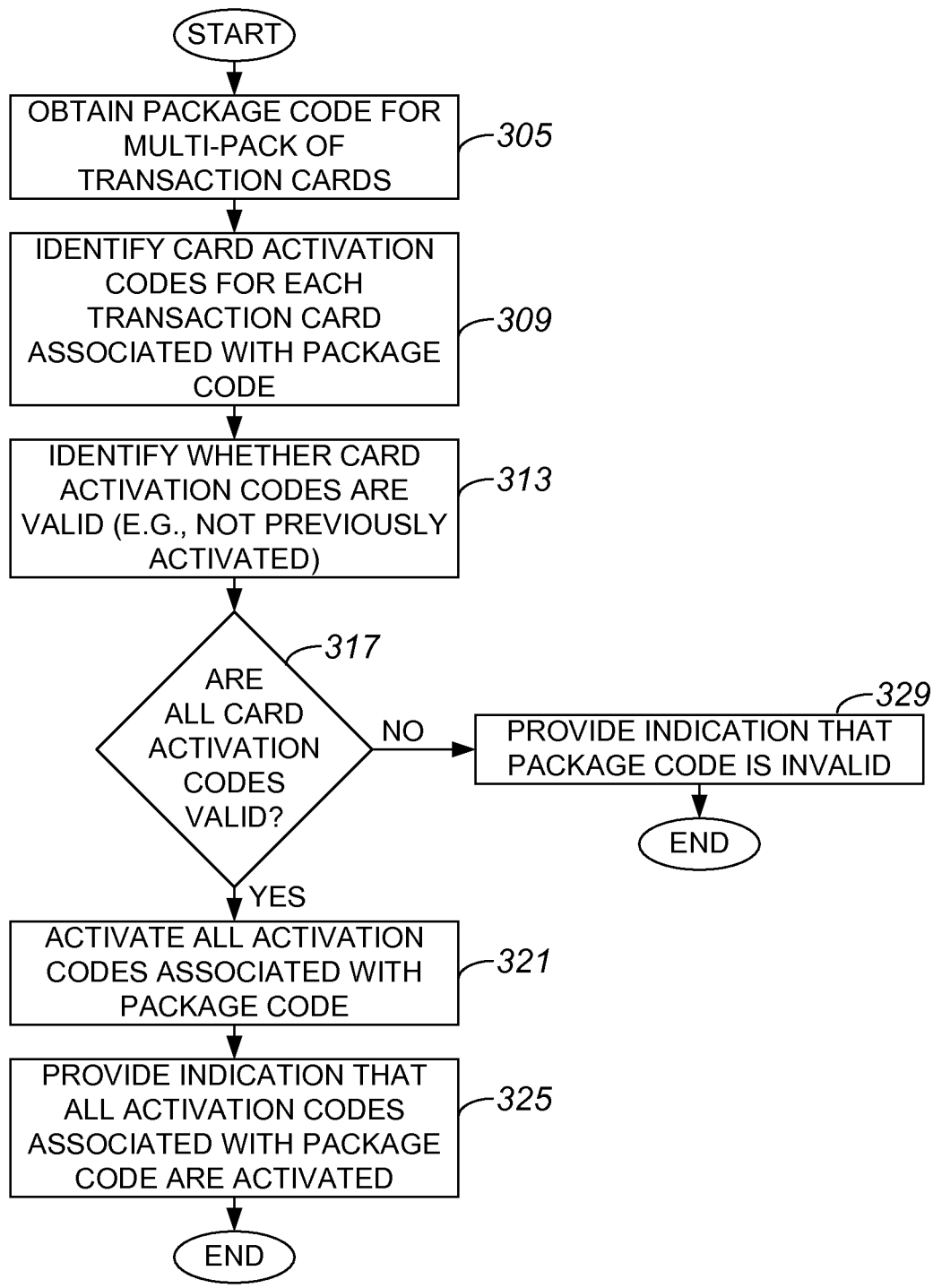
FIG. 3 is a process flow diagram which illustrates a method of activating a multi-pack package of transaction cards from the point-of-view of an activation system, e.g., a card provider, in accordance with an embodiment of the present invention.

FIG. 3 is a process flow diagram which illustrates a method of activating a multi-pack package of transaction cards from the point-of-view of an activation system, e.g., a card provider, in accordance with an embodiment of the present invention. A process 301 of activating a multi-pack package of transaction cards from the point-of-view of an activation system begins at step 305 in which the activation system obtains a package code, e.g., a retailer-specific parent code, for a multi-pack package of transaction cards. The activation system may identify the package code as being distinct from a transaction card activation code, for example, by identifying characters in the package code which are arranged to substantially signify a package code. The package code may be obtained when the package code is effectively scanned in, or otherwise provided by, a POS of a retailer and sent to the activation system.

In step 309, card activation codes for each transaction card associated with the package code are identified. The card activation codes may be identified using a data structure, e.g., a list, which associates the package code with card activation codes of the transaction cards. In other words, card activation codes may be identified by determining which card activation codes are effectively mapped to the package code.

Once the card activation codes are identified, it is then identified or otherwise determined in step 313 whether each of the card activation codes are valid. Such an identification may include, but is not limited to including, identifying whether the transaction cards associated with each of the card activation codes have yet to be activated. A determination is made in step 317 as to whether substantially all card activation codes are valid. In other words, it is effectively ascertained whether each transaction card in the multi-pack package of transaction cards is valid.

If the determination in step 317 is that substantially all card activation codes are valid, the indication is that each transaction card in the multi-pack package of transaction cards is valid. Accordingly, in step 321, substantially all activation codes associated with the package code assigned to the multi-pack package of transaction codes are activated. In general, any suitable method for activating or validating the activation codes may be used. By way of example, a flag associated with an entry in a data structure stored by an activation system may be set to indicate that a particular activation code and, hence, an associated transaction card is activated.

After the activation codes associated with the package code are activated, process flow proceeds to step 325 in which the activation system provides an indication arranged to indicate that the activation codes are activated. Such an indication may be provided by sending an activation message to the POS of a retailer, or the POS from which the package code was obtained in step 305. Upon providing an indication that the activation codes are activated, the process of activating a multi-pack package of transaction cards from the point-of-view of an activation system is completed.

Alternatively, if it is determined in step 317 that substantially all card activation codes are not valid, the implication is that at least one transaction card in the multi-pack package of transaction cards may not be activated. As such, the activation system provides an indication, e.g., to the POS from which the package code was obtained, that the package code is invalid in step 329, the process of activating a multi-pack package of transaction cards from the point-of-view of an activation system is terminated.

In one embodiment, a plurality of transaction cards is paired or otherwise associated with a package code substantially only after the plurality of transaction cards are identified. That is, until a set of transaction cards is identified for use in a multi-pack package of transaction cards, a package code is not associated with the multi-pack package of transaction cards. When an order to assemble a multi-pack package of transaction cards is received by an assembler, e.g., from an originator of the transaction cards, the order may generally include a list of package codes, but does not specify which transaction cards are to be associated with each package code. In other words, an association between a set of activation codes and a package code is generally not provided to an assembler.

Figure 4:
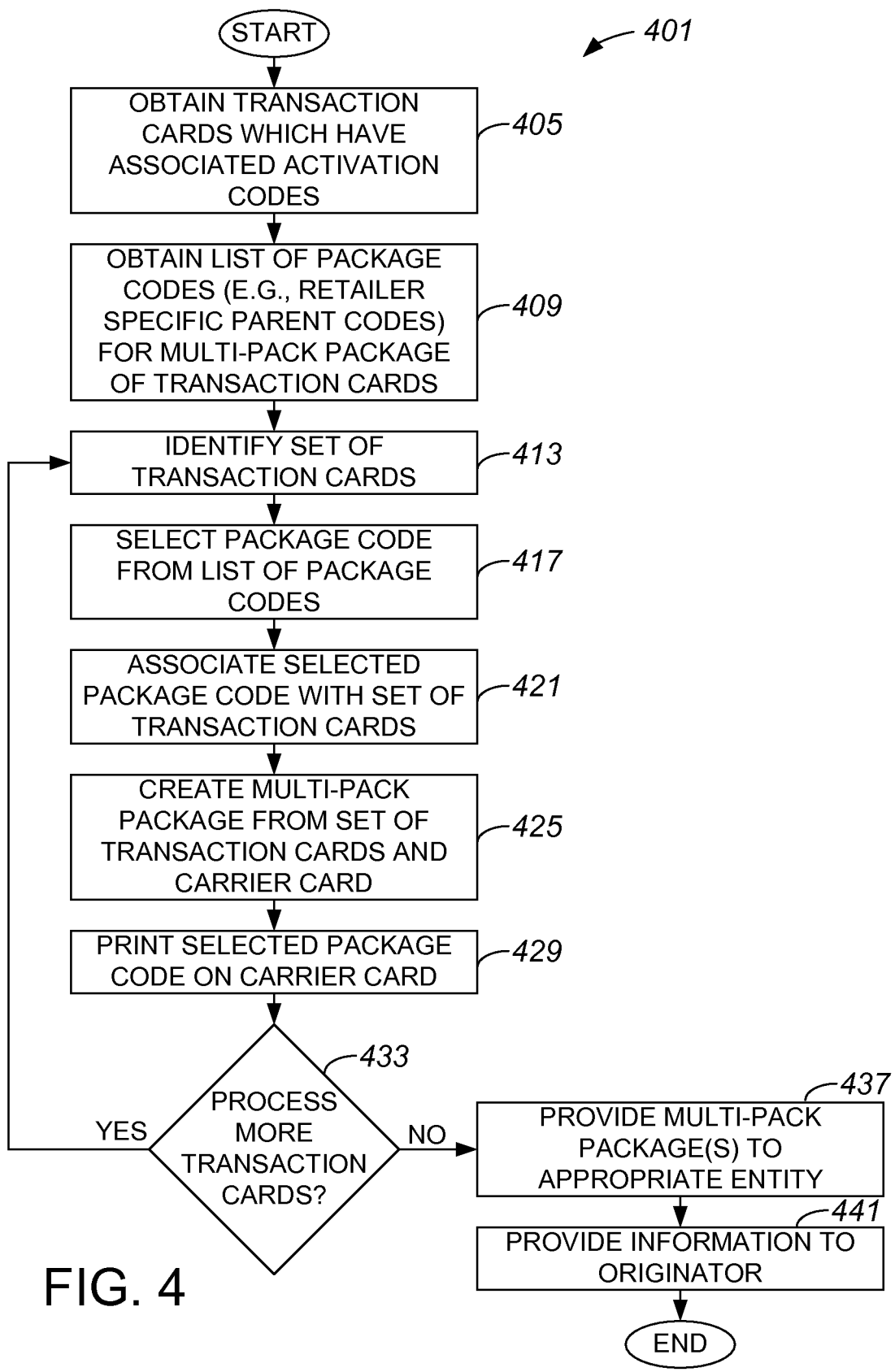
FIG. 4 is a process flow diagram which illustrates a process of associating transaction cards with a package number in accordance with an embodiment of the present invention.

FIG. 4 is a process flow diagram which illustrates a process of associating transaction cards with a package number during a multi-pack package assembly process in accordance with an embodiment of the present invention. A process 401 of associating transaction cards and, hence, activation codes with a package begins at step 405 in which transaction cards, which each have an associated activation code, are obtained. The transaction cards may be obtained or otherwise provided by, for example, by a retailer who originates the transaction cards.

A list of package codes for multi-pack packages of transaction cards is obtained in step 409. The list of parent codes, e.g., retailer-specific parent codes, may be provided in a "parent code" file which includes. One example of a parent code file will be described below with respect to FIG. 5A. Such a parent code file may be included in an order to create multi-pack packages received from a retailer. In embodiment, a list of package codes does not specify which activation codes are to be associated with the packages codes. That is, a list of package codes does not provide a mapping between specific activation codes and package codes.

After the list of package codes is obtained, a first set of transaction cards or a first set of activation codes is identified in step 413. The parent code file can indicate the number and/or order of transaction cards to be included in the multi-pack packages. The first set of transaction cards may be any number of transaction cards, which each have a unique activation code, which are to be associated with a single multi-pack package of transaction cards. Once the first set of transaction cards is identified, a package code is selected from the list of package codes in step 417.

The selected package code is associated in step 421 with the set of transaction cards previously identified in step 413. It should be appreciated that prior to step 421, the selected package code for a multi-pack package of transaction cards is not mapped to a specific set of transaction cards and, hence, the activation codes of the transaction cards, that are to be included in the multi-pack package. Associating a package code with a set of transaction cards may include creating and/or updating a "mapping" file which is arranged to identify the activation codes of transaction cards that are associated with a specific package code. One suitable mapping file will be described below with reference to FIG. 5B.

Once the selected package code is associated with a set of transaction cards, a multi-pack package is created from the set of transaction cards and a carrier card in step 425. Creating a multi-pack package may include, but is not limited to including, using an adhesive to substantially secure each transaction card to the carrier card or a tray associated with the carrier card. After the multi-pack package is created, the selected package code is printed on the carrier card in step 429. It should be appreciated that although the selected package code is printed on the carrier card after the multi-pack package is created, the selected package code may instead be printed on the carrier card prior to creating the multi-pack package. Printing the selected package code on the carrier card may include verifying that the activation codes of the transaction cards which are part of the multi-pack package are those that were previously associated with the package code in step 421.

A determination is made in step 433 as to whether there are more transaction cards to process. In other words, it is determined whether more multi-pack packages are to be created. If the determination is that there are more transaction cards to process, then process flow returns to step 413 in which another set of transaction cards is identified.

Alternatively, if the determination is that there are no more transaction cards to process, then at least one multi-pack package of transaction cards is provided to an appropriate entity in step 437. Typically, each multi-pack package which has been created based on the list of package codes obtained in step 409 is provided to the appropriate entity. Providing a multi-pack package to an appropriate entity may include transporting the multi-pack package to the appropriate entity. In one embodiment, the appropriate entity may be an originator, e.g., a provider of the transaction cards, or a third-party retailer that will display and/or sell multi-pack packages.

Information is provided to an originator in step 441 to effectively inform the originator that at least one multi-pack package has been created. The information may include a mapping file which provides a mapping between each parent code and the transaction cards in each multi-pack package. Once the information is provided, the process of associating transaction cards and, hence, activation codes with a package is completed.

Figure 5A:
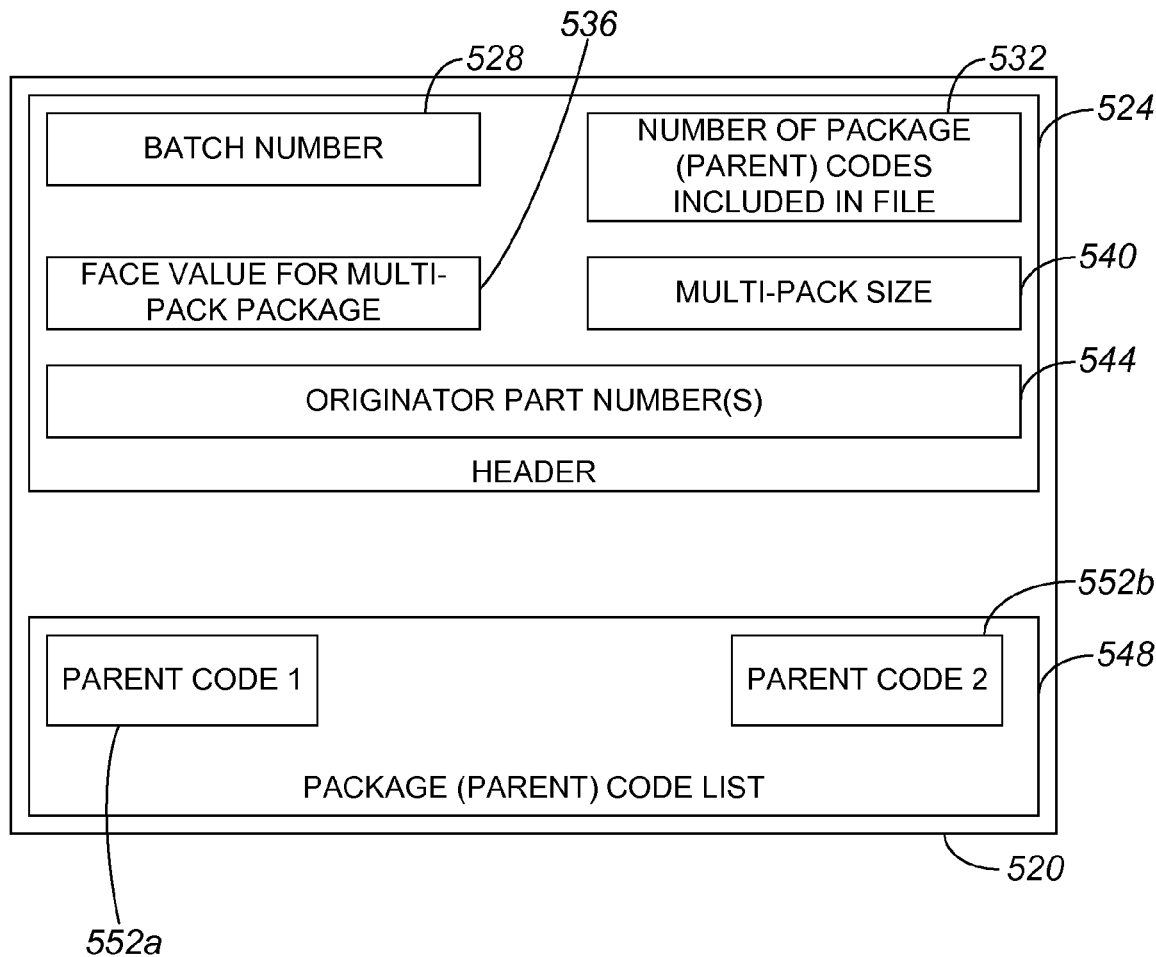
FIG. 5A is a block diagram representation of a "parent code" file in accordance with an embodiment of the present invention.

As previously mentioned, package codes may be provided, e.g., by a retailer to an external partner such as a multi-pack package assembler, in a package code file. With reference to FIG. 5A, one embodiment of a package code file will be described. A package code file 520 is arranged to be delivered or provided to a multi-pack package assembler or packaging company. Package code file 520 includes a header portion 524 and a package or parent code list 548 that includes at least one parent code 552.

Header portion 524 includes a batch number 528 associated with parent codes 552a, 552b included in parent code list 548. Batch number 528 may generally be specified in any suitable format. By way of example, batch number 528 may be specified as a string of approximately twelve characters which may include a prefix and a number of digits. Header portion 524 also includes a number 532 of parent codes included in package code file 520, a face value 536 for multi-pack packages that are to be created using parent codes 552a, 552b, and a multi-pack size 540 which specifies a number of transaction cards to be included in each multi-pack package.

Package or parent code list 548 includes at least one parent code 552a, 552b. It should be appreciated that although two parent codes 552a, 552b are shown, package code list 548 may generally include any number of parent codes 552a, 552b. Parent codes 552a, 552b may generally be character strings of any suitable length. By way of example, parent codes 552a, 552b may include a prefix, a sequence number, and a checksum. In one embodiment, such a prefix may include approximately three characters, such a sequence number may include approximately eleven digits, and such a checksum may include approximately two digits.

Package code file 520 may be specified in any suitable format. In one embodiment, package code file 520 may be specified in a file format in which entries are separated by commas. For example, package code file 520 may list batch number 528, number 532 of parent codes, face value 536, size 540, part numbers 544, parent code 552a, and parent code 552b substantially all separated by commas. The part numbers 544 can identify the transaction cards to be included in the multi-pack packages. Also, the ordering of the part numbers 544 can signify the order of placement of the transaction cards within the multi-pack packages.

Figure 5B:
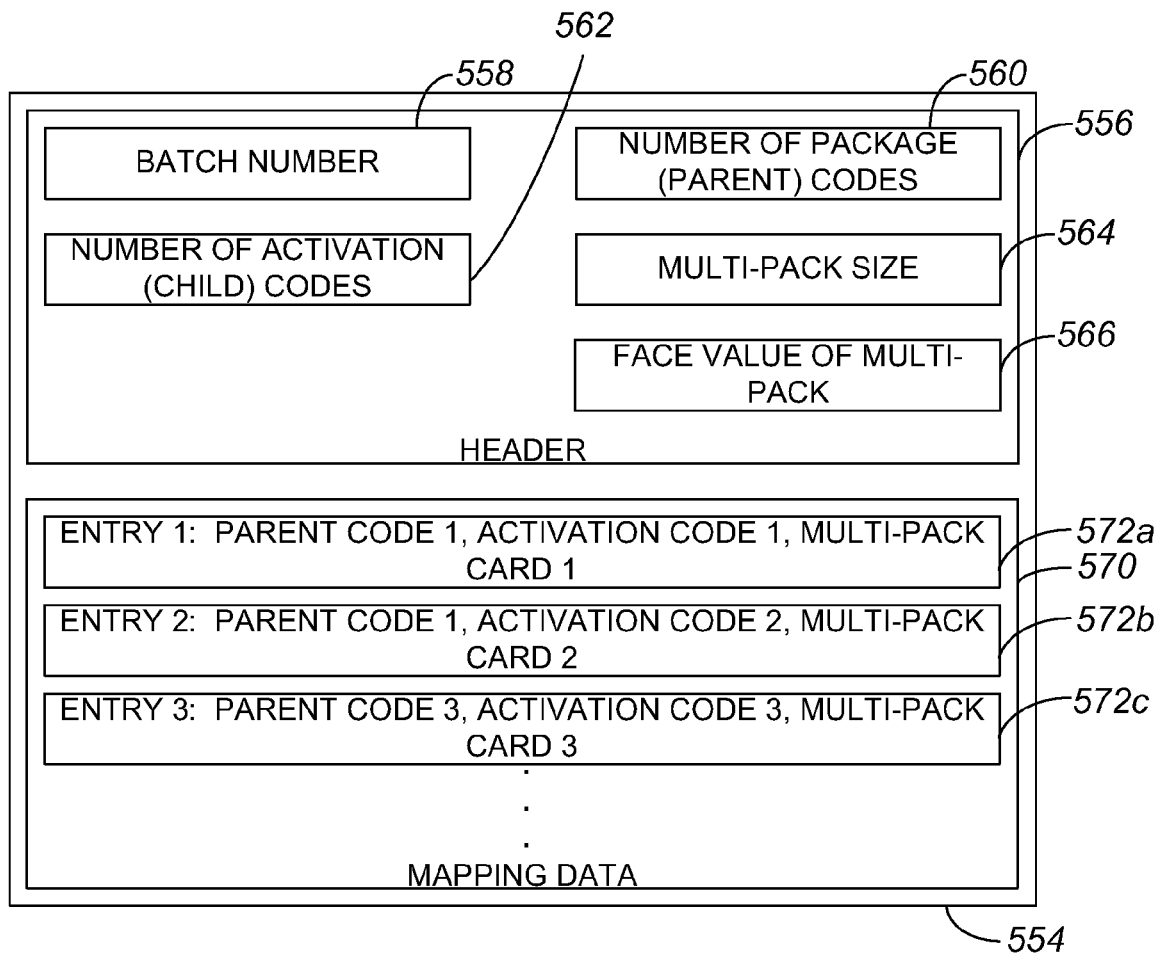
FIG. 5B is a block diagram representation of a "mapping" file in accordance with an embodiment of the present invention.

Upon receiving package code file 520, an external partner such as an assembler or packager may use package code file 520 to create multi-pack packages of transaction cards. In one embodiment, the external partner may create a mapping file which identifies associations between package or parent codes 552a, 552b and transaction cards mapped to package codes 552a, 552b. Referring next to FIG. 5B, an example of a mapping file will be described in accordance with an embodiment of the present invention. A mapping file 554, which may be created by a multi-pack package assembler of packager, is arranged to provide mappings between package or parent codes and activation or child codes, e.g., codes associated with transaction cards. Mapping file 554 includes a header portion 556 and mapping data 570.

Header portion 556 includes a batch number 558 which identifies the batch of parent codes which was effectively processed to generate multi-pack packages. Header portion 556 also includes a number 560 of parent codes which is, typically, substantially the same as a number of multi-pack packages associated with batch number 558. A number 562 of activation or child codes identifies a total number of transaction cards used to create multi-pack packages associated with parent codes 560. A multi-pack size 564 and a face value 566 of each multi-pack package are also specified in header portion 556.

It should be appreciated that the contents of header portion 556 may vary widely. Information may be added and removed depending upon the requirements of a particular system within which mapping file 554 is generated and used. By way of example, in lieu of specifying a number 562 of activation codes or a "child count," a number of activation codes associated with batch number 558 may be determined by substantially multiplying multi-pack size 564 by number 560 of parent codes.

Mapping data 570 may generally include any number of entries 572*a-c*. In general, mapping data 570 includes a number of entries 572*a-c* that is substantially equal to number 562 of activation codes. Each entry 572*a-c* corresponds to a transaction card or an activation code, and identifies the activation code, a parent code for the multi-pack package with which the activation code is associated, and an indication of a position of the transaction card relative to the multi-pack package. For example, if each multi-pack size 564 is "two," thus effectively indicating that each parent code is associated with two activation codes, entry 572*a* may identify a first transaction card or activation code as being a first transaction card associated with a first parent code, entry 572*b* may identify a second transaction card as being a second transaction card associated with the first parent code, and entry 572*c* may identify a third transaction card as being a first transaction card associated with a second parent code. Each parent code and child code included in mapping data may include any number of characters, as for example a prefix, a unique sequence number, and a checksum.

Figure 6A:
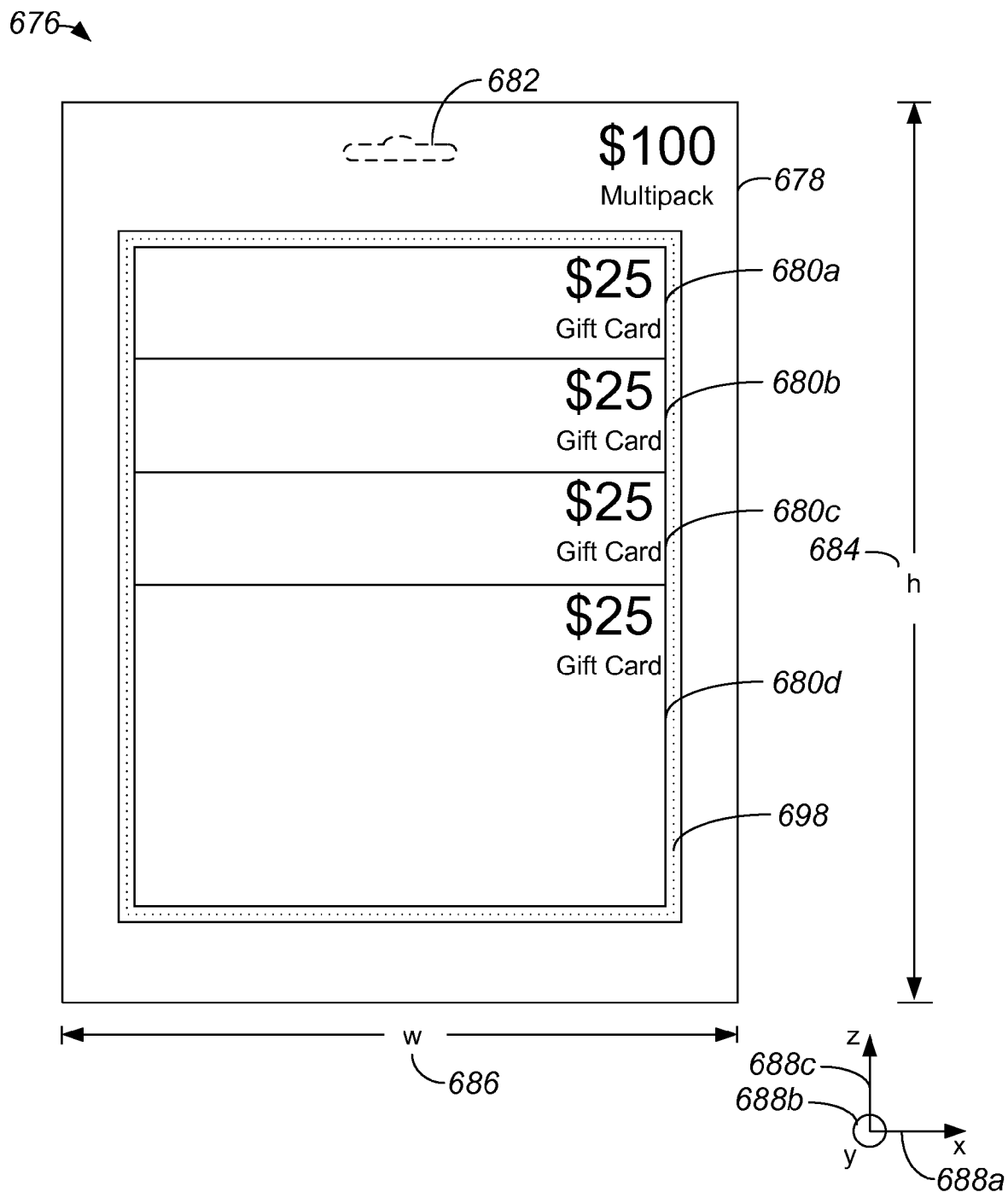
FIG. 6A is a diagrammatic front-view representation of a multi-pack package which includes multiple transaction cards that may be activated using a single package code in accordance with an embodiment of the present invention.

A multi-pack package of transaction cards may be of substantially any size, and may include any number of transaction cards. FIG. 6A is a diagrammatic front-view representation of a multi-pack package of transaction cards in accordance with an embodiment of the present invention. A multi-pack package 676 includes a carrier card arrangement 678 which supports four transaction cards 680*a-d*. It should be appreciated that although four transaction cards 680*a-d* are shown, multi-pack package 676 is not limited to including four transaction cards 680*a-d*, and may instead include fewer than or more than four transaction cards 680*a-d*.

In one embodiment, transaction cards 680*a-d* may be supported on a sleeve or a tray (not shown) that is inserted within carrier card arrangement 678. Such a sleeve (not shown) will be discussed below with reference to FIG. 7. Transaction cards 680*a-d* may be of substantially any size. By way of example, transaction cards 680*a-d* may each be approximately three inches in width and approximately two inches in height.

Similarly, the dimensions of carrier card arrangement 678 may also vary widely. By way of example, a height h 684 relative to a z-direction 688*c* and a width w 686 relative to an x-direction 688*a* of carrier card arrangement 678 may be widely varied. By way of example, height h 684 may be approximately six inches and width w 686 may be approximately four inches. Generally, height h 684 may be increased as appropriate to accommodate additional transaction cards 700*a-d*. Additionally, a thickness (not shown) relative to a y-direction 688*b* of carrier card arrangement 678 may also vary.

Carrier card arrangement 678 includes a relatively transparent window piece 698, e.g., a plastic piece, which protects transaction cards 680*a-d* while allowing front surfaces of transaction cards 689*a-d* to be viewed. Carrier card arrangement 678 may also include an opening 682 which allows multi-pack package 676 to be hung on a display rack, e.g., a display rack managed by a third-party retailer. It should be understood, however, that opening 682 may not be necessary in the event that multi-pack package 676 is not intended to be displayed on a display rack.

Figure 6B:
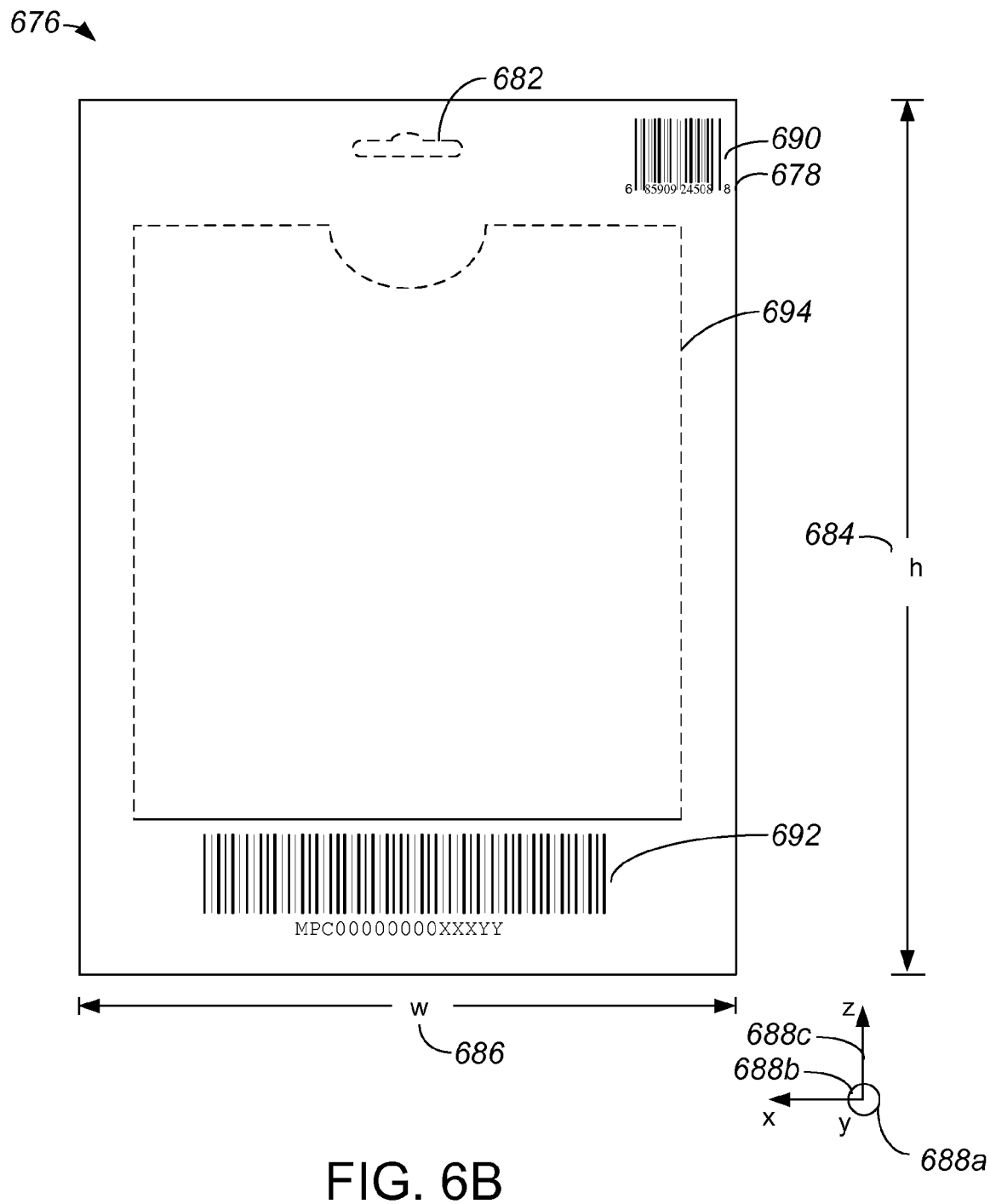
FIG. 6B is a diagrammatic back-view representation of a multi-pack package, e.g., multi-pack package 676 of FIG. 6A, which includes multiple transaction cards that may be activated using a single package code in accordance with an embodiment of the present invention.

FIG. 6B is a diagrammatic back-view representation of multi-pack package 676. A back surface of carrier card arrangement 678 includes a package or parent code 692 which may be scanned or otherwise read to activate and to authenticate transaction cards 680*a-d*. In the described embodiment, package code 692 includes a bar code and a character string associated with the bar code. Transaction cards 680*a-d* are arranged to each be activated and authenticated substantially simultaneously by causing information associated with package code 692 to be obtained and then transmitted to an authentication and activation server. The back surface of carrier card arrangement 678 also includes a UPC code 690 that may also be arranged to be scanned to activate and to authenticate transaction cards 680*a-d*. Typically, the UPC code 690 is used by merchants to identify and price products at point of sale (POS).

Back surface of carrier card arrangement 678 may include a flap or a "garage door" 694 which is arranged to be opened to facilitate the removal of transaction cards 680*a-d* that are positioned in a receptacle or a cavity (not shown) of carrier card arrangement 678. The inclusion of flap 694 also facilitates the inclusion of other elements, e.g., coupons or a bonus transaction card, in carrier card arrangement 678. In one embodiment, flap 694 is arranged to remain substantially attached to the back surface of carrier card arrangement 678 when opened to expose a cavity (not shown) in carrier card arrangement 678.

Figure 7:
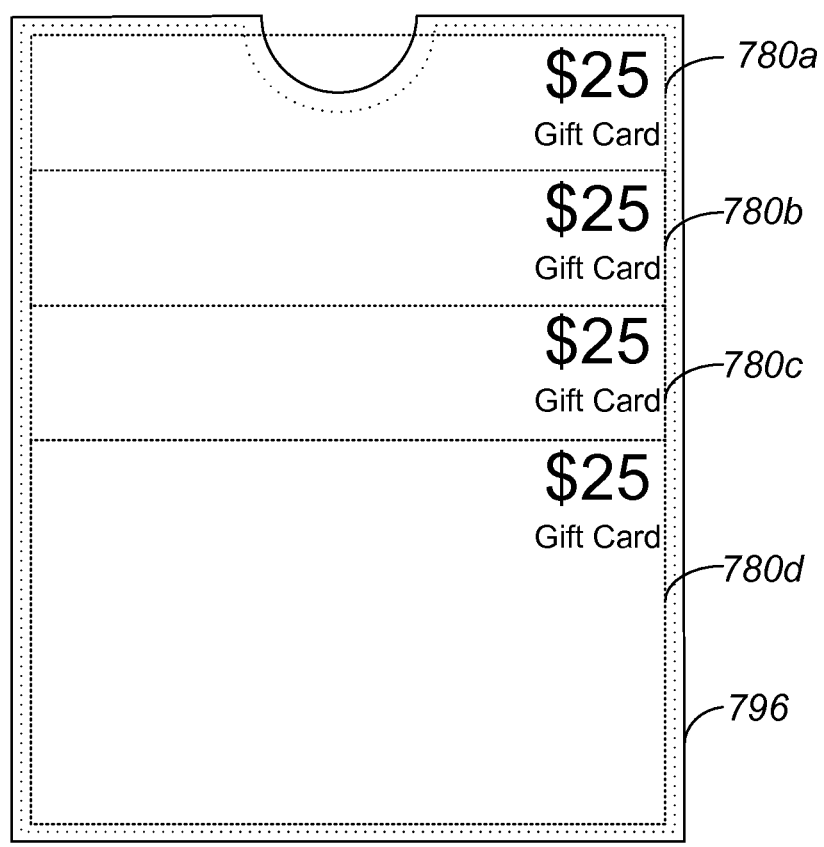
FIG. 7 is a diagrammatic front-view representation of multiple transaction cards mounted on a sleeve in accordance with an embodiment of the present invention.

As previously mentioned, transaction cards 680*a-d* may be mounted on a sleeve or a tray (not shown) to form an overall assembly which is arranged to fit in a cavity (not shown) of carrier card arrangement 678. Mounting transaction cards 680*a-d* on a sleeve (not shown) using an adhesive material allows transaction cards 680*a-d* to be readily removed, and also readily inserted, within carrier card arrangement 678. With reference to FIG. 7, an overall assembly which includes a sleeve and multiple transaction cards will be described in accordance with an embodiment of the present invention. Transaction cards 780*a-d* are arranged to be positioned on a sleeve 796. Sleeve 786 may be formed from any suitable material including, but not limited to including, plastic. Transaction cards 780*a-d* are positioned, in one embodiment, in a fanned pattern such that a front surface of transaction card 780*d* is mostly visible, while portions of transaction cards 780*a-c* are visible.

In general, the size and shape of sleeve 796 may vary based upon a variety of factors. Such factors include, but are not limited to including, the size of transaction cards 780*a-d*, the number of transaction cards 780*a-d*, and/or the size of a carrier card arrangement (not shown) within which sleeve 796 and transaction cards 780*a-d* are to be accommodated.

Figure 8:
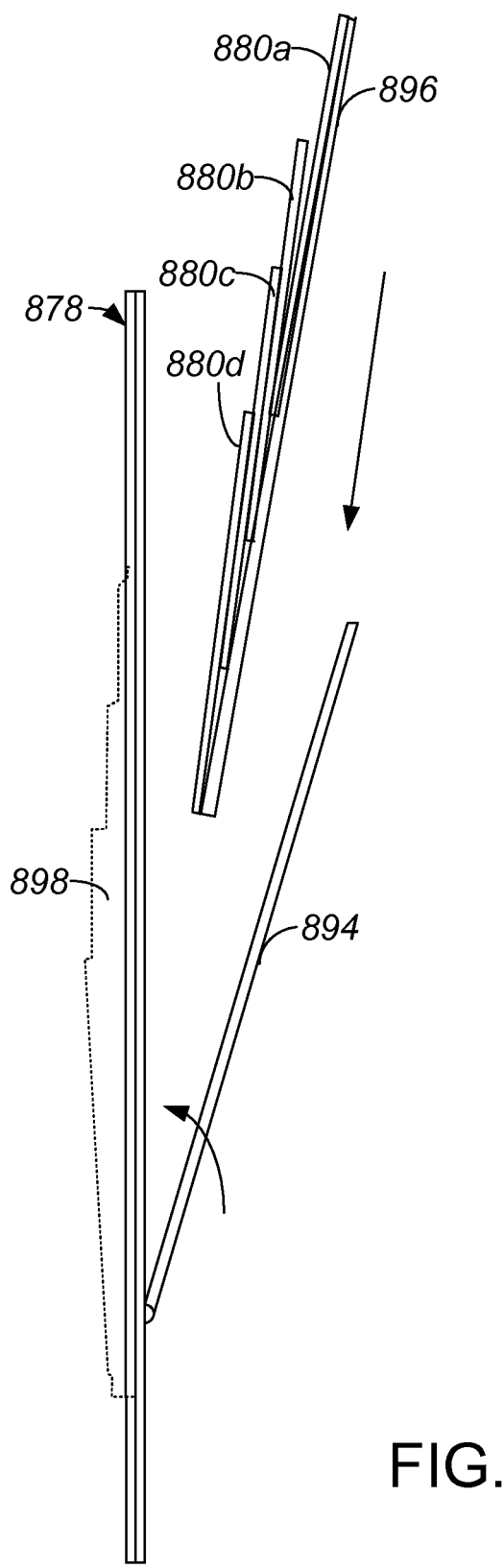
FIG. 8 is a diagrammatic side-view representation of multiple transaction cards mounted on a sleeve which is to be inserted within a carrier card arrangement in accordance with an embodiment of the present invention.

FIG. 8 is a diagrammatic side-view representation of multiple transaction cards mounted on a sleeve which is to be inserted within a carrier card arrangement in accordance with an embodiment of the present invention. Transaction cards 880*a-d* are mounted on a sleeve or a carrier tray 896 which is sized to fit within a cavity in a carrier card arrangement 878 that is at least partially defined by a window piece 898. As shown, window piece 898 is sized and shaped to accommodate transaction cards 880*a-d*. A flap 894 may be opened to enable transaction cards 880*a-d* and sleeve 896 to be placed within, or removed from within, carrier card arrangement 878.

Although only a few embodiments of the present invention have been described, it should be understood that the present invention may be embodied in many other specific forms without departing from the spirit or the scope of the present invention. By way of example, a package code that may be a retailer-specific parent code has been described as being a 16-digit alphanumeric code. The package code, however, may generally be any suitable code, alphanumeric or otherwise, and is not limited to being a 16-digit alphanumeric code.

A package code file has been described as generally being generated by an originator or a retailer when multi-pack packages of transaction cards are to be created and sold, e.g., by a third-party retailer. Prior to providing a package code file to a packager, the retailer may define artwork to be displayed on transaction cards and on the multi-pack packages, define a denomination of the transaction cards to be included in the multi-pack packages, and define a number of transaction cards to be included in each multi-pack package. The retailer may also coordinate with a manufacturer of transaction cards to provide appropriate transaction cards to the packager. In one embodiment, the transaction cards and their associated child activation codes are provided to a packager separately from a package code file that includes parent activation codes. The parent activation codes may then be assigned to or otherwise associated with the child codes by the packager.

As mentioned above, the size of a transaction card may vary widely. For instance, a transaction card may be the size of a standard CR-80 card. Alternatively, a transaction card may be smaller than a CR-80 card, e.g., approximately two inches in height and approximate three inches in width as described above, or larger than a CR-80 transaction card.

Adhesive has been described as being suitable for mounting or otherwise securing transaction cards to a surface associated with a carrier card arrangement. In general, transaction cards may be substantially secured to a carrier card using any suitable method. For example, transaction cards may be secured to a carrier card by inserting transaction cards in slits or cuts that are made in the carrier card.

Displaying transaction cards in a fanned pattern on the surface of a carrier card, or such that the transaction cards may be viewed from a front surface of a carrier card is viewed, allows a purchaser to readily see each transaction card that he or she is purchasing when he purchases a multi-pack of transaction cards. However, transaction cards of a multi-pack are not limited to being displayed in a fanned pattern. For instance, transaction cards may be stacked one on top of the other such that substantially only a front surface of a top transaction card in a stack may be seen.

Any number of transaction cards may be included in a multi-pack of transaction cards. That is, while multi-packs which include three transaction cards or four transaction cards have been described, multi-packs are not limited to including three transaction cards or four transaction cards. Multi-packs may include fewer than three transaction cards or more than four transaction cards.

While a carrier card arrangement has been described as including more than one of the same transaction card, it should be appreciated that a carrier assembly may include different transaction cards. That is, a multi-pack of transaction cards is not limited to including one version of a transaction card. In one embodiment, the transaction cards included in a multi-pack may be associated with different values or denominations. In another embodiment, the transactions cards included in a multi-pack may be of different designs, e.g., color schemes.

As described above, a carrier card arrangement may have an overall activation code printed or otherwise provided thereon which may be used to activate substantially all transaction cards mounted on or within the carrier card arrangement. However, the overall activation code is not limited to being printed on or otherwise provided with a carrier card arrangement. For example, the overall activation code may be an activation code associated with a parent transaction card. That is, an activation code associated with a parent transaction card may be configured to activate the parent transaction card as well as associated child transaction cards. Hence, by reading the activation code from a parent transaction card mounted on a carrier card, substantially all the transaction cards mounted on the carrier card may then be activated.

The operations associated with the various methods of the present invention may vary widely. By way of example, steps may be added, removed, altered, combined, and reordered without departing from the spirit or the scope of the present invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for forming a carrier package arrangement, the method comprising:
    obtaining a plurality of transaction cards;
    obtaining a first parent activation code;
    associating, by one or more one computing devices, the first parent activation code with the plurality of transaction cards;
    packing the plurality of transaction cards in the carrier package arrangement;
    providing the first parent activation code so as to be on or accessible from the carrier package arrangement, wherein the plurality of transaction cards is arranged to be activated using the first parent activation code; and
    creating, by the one or more one computing devices, a mapping file having a header, the header including at least the first parent activation code and the number of transactions cards associated with the first parent activation code,
    wherein the plurality of transaction cards includes a first transaction card and a second transaction card, the first transaction card having a first card activation code and the second transaction card having a second card activation code, and wherein associating the first parent activation code with the plurality of transaction cards includes associating the first parent activation code with the first card activation code and the second card activation code.

2. The method of claim 1 wherein identifying the first parent activation code includes obtaining a first file that includes at least the first parent activation code.

3. The method of claim 1, wherein the first card activation code is arranged to cause the first transaction card to activated using the parent activation code and the second card activation code is arranged to cause the second transaction card to be activated using the parent activation code.

4. The method of claim 1 further including:
    wherein the mapping file is arranged to activate the plurality of transaction cards.

5. The method of claim 4 wherein the mapping file is further arranged to identify the carrier package arrangement as including the plurality of transaction cards.

6. The method of claim 1 wherein
    the mapping file is arranged to activate the first card activation code and the second card activation code.

7. A method of claim 1 wherein said associating of the first parent code with the plurality of transaction cards is performed proximate in time to said packing of the plurality of transaction cards in the carrier package arrangement.

8. A method of activating a plurality of transaction cards, the plurality of transaction cards being included in a card package, the card package having a package activation code, the method comprising:
- obtaining information associated with the package activation code;
- Identifying, by one or more one computing devices, the plurality of transaction cards as being mapped to the package activation code using the information, wherein identifying the plurality of transaction cards as being mapped to the package activation code includes accessing a mapping file, the mapping file including a header having at least the package activation code and the number of transactions cards associated with the package activation code;
- determining, by the one or more one computing devices, if each transaction card of the plurality of transaction cards is in an unactivated state;
- determining if each transaction card of the plurality of transaction cards is valid; and
- using the package activation code to transition each transaction card of the plurality of transaction cards from the unactivated state to an activated state if it is determined that each transaction card of the plurality of transaction cards is in the unactivated state and if it is determined that each transaction card of the plurality of transaction cards is valid.

9. The method of claim 8 wherein the plurality of transaction cards includes a first transaction card and a second transaction card, and wherein identifying the plurality of transaction cards as being mapped to the package activation code includes identifying a first card activation code of the first transaction card and a second card activation code of the second transaction card.

10. The method of claim 9 wherein using the package activation code to transition each transaction card of the plurality of transaction cards from the unactivated state to the activated state includes using the package activation code to activate the first card activation code and the second card activation code.

11. The method of claim 8 wherein using the package activation code to transition each transaction card of the plurality of transaction cards from the unactivated state to the activated state includes authorizing the parent code.

12. A carrier package arrangement comprising:
- a carrier card arrangement;
- a tray; and
- a plurality of transaction cards, the plurality of transaction cards being mounted on the tray, the tray being supported within the carrier card arrangement, wherein the plurality of transaction cards are arranged to be transitioned from an unactivated state to an activated state using a first activation code,
- wherein the plurality of transaction cards includes a first transaction card and a second transaction card, the first transaction card having a first card activation code and the second transaction card having a second card activation code, and wherein associating the first parent activation code with the plurality of transaction cards includes associating the first parent activation code with the first card activation code and the second card activation code, and
- wherein a mapping file is formed or updated to include a header including at least the first parent activation code and the number of transactions cards associated with the first parent activation code.

13. The carrier package arrangement of claim 12 wherein the first activation code is provided on the carrier card arrangement.

14. The carrier package arrangement of claim 13 wherein the first activation code is associated with a bar code.

15. The carrier package arrangement of claim 12 wherein the carrier card arrangement has a receptacle defined therein, and wherein the plurality of transaction cards and the tray are supported within the receptacle.

16. The carrier package arrangement of claim 15 wherein the carrier card arrangement includes a flap, the flap being arranged to be opened to at least partially expose the receptacle.

17. A method for forming carrier package arrangements, the method comprising:
- obtaining a plurality of transaction cards, the plurality of transaction cards including a first transaction card having a first card activation code and a second transaction card having a second card activation code;
- obtaining a parent code file, the parent code file including at least a first parent code, a second parent code, a first number of transaction cards associated with the first parent code, and a second number of transaction cards associated with the second parent code;
- defining, by one or more one computing devices, a first set of transaction cards, wherein the first set of transaction cards includes at least the first transaction card;
- creating, by the one or more one computing devices, a mapping file having a header, the header including at least information mapping the first parent code to the first set of transaction cards and the number of transactions cards in the first set of transaction cards, wherein mapping the first parent code to the first set of transaction cards includes mapping the first parent code to at least the first card activation code;
- assembling the first set of transaction cards into a first carrier package arrangement; and
- providing the first parent code on the first carrier package arrangement, wherein the first set of transaction cards is arranged to be activated using the first parent code.

18. The method of claim 17 wherein the mapping file is arranged to indicate that the first parent code is mapped to the first set of transaction cards.

19. The method of claim 18 further including:
- defining a second set of transaction cards, wherein the second set of transaction cards includes at least the second transaction card;
- mapping the second parent code to the second set of transaction cards, wherein mapping the second parent code to the second set of transaction cards includes mapping the second parent code to at least the second card activation code;
- assembling the second set of transaction cards into a second carrier package arrangement; and
- providing the second parent code on the second carrier package arrangement, wherein the second set of transaction cards is arranged to be activated using the second parent code.

20. The method of claim 19 wherein the mapping file is further arranged to indicate that the second parent code is mapped to the second set of transaction cards.

* * * * *

UNITED STATES PATENT AND TRADEMARK OFFICE
CERTIFICATE OF CORRECTION

| | | |
|---|---|---|
| PATENT NO. | : 8,640,949 B2 | Page 1 of 1 |
| APPLICATION NO. | : 12/262097 | |
| DATED | : February 4, 2014 | |
| INVENTOR(S) | : Biskupski et al. | |

It is certified that error appears in the above-identified patent and that said Letters Patent is hereby corrected as shown below:

IN THE CLAIMS:

Col. 12, Line 51, (claim 3), "activated" should be --be activated--

Signed and Sealed this
Tenth Day of November, 2015

Michelle K. Lee
*Director of the United States Patent and Trademark Office*